United States Patent [19]

Luetzelschwab

[11] Patent Number: 4,867,239
[45] Date of Patent: Sep. 19, 1989

[54] OIL RECOVERY PROCESS USING A TREATED POLYMER SOLUTION

[75] Inventor: Wayne E. Luetzelschwab, Littleton, Colo.

[73] Assignee: Marathon Oil Company, Findlay, Ohio

[21] Appl. No.: 238,706

[22] Filed: Aug. 31, 1988

[51] Int. Cl.[4] ............................................. E21B 43/22
[52] U.S. Cl. ................................... 166/273; 166/274; 252/4.553; 524/555
[58] Field of Search ....................... 166/273, 274, 275; 252/8.553; 524/421, 423, 555

[56] References Cited

U.S. PATENT DOCUMENTS

| | | | |
|---|---|---|---|
| Re. 32,114 | 4/1986 | Argabright . | |
| 3,532,657 | 10/1970 | Dick et al. | 524/421 |
| 3,827,977 | 8/1974 | Miles et al. | 252/8.55 B |
| 4,068,719 | 1/1978 | Clampitt et al. | 166/302 X |
| 4,172,041 | 10/1979 | Clampitt et al. | 166/307 X |
| 4,248,304 | 2/1981 | Phillips | 166/300 |
| 4,331,543 | 5/1982 | Wilson et al. | 252/8.55 D |
| 4,414,334 | 11/1983 | Hitzman | 435/262 |
| 4,440,650 | 4/1984 | Watson et al. | 252/8.55 D |
| 4,476,931 | 10/1984 | Boles et al. | 166/294 |
| 4,486,340 | 12/1984 | Glass, Jr. | 252/8.55 D |
| 4,527,626 | 7/1985 | Cantu et al. | 166/275 |
| 4,572,292 | 2/1986 | Stapp | 166/274 |
| 4,636,572 | 1/1987 | Hudson et al. | 556/2 |

OTHER PUBLICATIONS

Yang, S. H. and Treiber, L. E., "Chemical Stability of Polyacrylamide Under Simulated Field Conditions", SPE Paper 14232, 60th Annual Technical Conference and Exhibition of the Society of Petroleum Engineers, Las Vegas, NV, Sep. 22-25, 1985.

*Primary Examiner*—William P. Neuder
*Attorney, Agent, or Firm*—Jack L. Hummel; Rodney F. Brown

[57] ABSTRACT

A polymer solution makeup water containing hydrogen sulfide is pretreated with an oxygenating agent to convert the hydrogen sulfide to an inert compound. The treated water is then mixed with an acrylamide polymer to form a stable polymer solution for oil recovery applications.

18 Claims, No Drawings

OIL RECOVERY PROCESS USING A TREATED POLYMER SOLUTION

BACKGROUND OF THE INVENTION

1. Technical Field

The present invention relates to a process for recovering hydrocarbons from a subterranean formation and more particularly to a process for recovering hydrocarbons from a subterranean formation using a pretreated injection fluid.

2. Background Information

Polymer solutions are used in certain flooding applications to facilitate oil recovery from subterranean formations. Unfortunately, a number of constituents found in the environment can degrade the polymer which diminishes the effectiveness of the resulting polymer solution for oil recovery applications. See Yang, et al, "Chemical Stability of Polyacrylamide Under Simulated Field Conditions", SPE 14232, presented September, 1985.

Yang et al suggest a means for preventing oxidative degradation of polyacrylamide in solution by limiting the amount of oxygen which contacts the solution or adding oxygen scavengers to the solution. However, a need exists for other means to reduce the risk of polymer degradation in polymer solutions employed in oil recovery applications.

SUMMARY OF THE INVENTION

The present invention is an oil recovering process employing a stable acrylamide polymer solution. The polymer does not undergo substantial degradation during preparation of the solution or its use. The process is particularly applicable where an aqueous liquid used as a solvent or diluent in the makeup of the polymer solution contains hydrogen sulfide.

The process is performed by first pretreating the aqueous hyrogen sulfide-containing liquid with an oxygenating agent. The oxygenating agent converts the hydrogen sulfide and any other oxygen-reactive sulfur-containing compounds to compounds which do not react with oxygen and do not substantially degrade acrylamide polymer. After pretreatment, the liquid is mixed with an acrylamide polymer to form a stable acrylamide polymer solution. The resulting polymer solution is then injected into a subterranean oil-bearing formation as an oil displacement flood to facilitate oil recovery from the formation.

The present process is advantageous because it does not require costly measures, such as the addition of an oxygen scavenger to the solution or storage of the polymer solution under an inert gas blanket to maintain the stability of the polymer solution. The invention is particularly unexpected because it deviates from convention which teaches away from the addition of any oxygenating agent to the polymer solution or its makeup components. The present invention recognizes that if an oxygenating agent is added to the aqueous hydrogen sulfide-containing makeup liquid of the polymer solution before it is combined with the polymer, the oxygenating agent can actually stabilize rather than degrade the resulting polymer solution.

DESCRIPTION OF A PREFERRED EMBODIMENT

The present invention is an oil recovery process which employs a water-soluble acrylamide polymer and an aqueous liquid in solution. The aqueous liquid of the present invention comprises water initially having a sufficient concentration of hydrogen sulfide to substantially degrade an acrylamide polymer upon contact. Exemplary aqueous liquids include produced oil field brines having a high total dissolved solids content, sea water, or fresh water from a source such as a lake, pond, river, underground aquifer, etc. Produced oil field brines are typically the most likely of the above-listed liquids to contain hydrogen sulfide in a concentration sufficient to degrade an acrylamide polymer.

There is no absolute threshold concentration above which hydrogen sulfide will degrade an acrylamide polymer upon contact because the concentration at which hydrogen sulfide degrades an acrylamide polymer is a function of temperature and the overall composition of the aqueous liquid containing the hydrogen sulfide. Nevertheless, an aqueous liquid having a hydrogen sulfide concentration greater than about 1 ppm and preferably greater than about 3 ppm generally contains sufficient hydrogen sulfide to substantially degrade an acrylamide polymer.

An aqueous liquid having a hydrogen sulfide concentration in the above-recited range is pretreated according to the present invention to reduce degradation of an acrylamide polymer when the liquid and polymer are contacted in solution. The term "polymer degradation" as used herein refers to scission of a polymer chain which reduces the average molecular weight of the polymer. Reducing the polymer's average molecular weight also reduces the polymer's viscosity and screen factor which renders the polymer solution less effective for oil recovery applications.

The hydrogen sulfide in the aqueous makeup liquid of the polymer solution is believed to chemically induce polymer degradation by reacting with the polymer in a manner which breaks the polymer chain. It is also believed that there may be other oxygen-reactive sulfur-containing compounds in the aqueous makeup liquid which likewise degrade the polymer. Such compounds can include sulfur-containing intermediates of reactions which occur in the presence of hydrogen sulfide and oxygen.

The aqueous liquid used in the makeup of the polymer solution is pretreated by contacting the aqueous liquid with an oxygenating agent for a period of time sufficient to convert the hydrogen sulfide and any other oxygen-reactive sulfur-containing compounds to compounds which are substantially inert with the polymer and which will not substantially degrade the polymer. Useful oxygenating agents include oxygen and air. Although not preferred, it may also be possible to employ specific oxidizing chemicals known in the art as oxygenating agents in the present process.

Sparging the liquid with a gaseous oxygenating agent is the preferred method of contacting the liquid and agent. Sparging is typically performed by bubbling a substantial volume of the gas through the aqueous liquid which is usually at ambient temperature and pressure. Alternatively, although less preferred, a liquid or solid oxygenating agent can be added directly to the aqueous liquid in a stoichiometric amount relative to the hydrogen sulfide concentration in the liquid.

Inert compounds which are the product of reactions between hydrogen sulfide and the oxygenating agent include element sulfur and sulfate-containing compounds, i.e., sulfates and bisulfates. Such compounds are generally characterized as substantially unreactive with oxygen under ambient conditions.

The treatment reduces the hydrogen sulfide concentration of the aqueous liquid to a level below about 1 ppm, preferably below about 0.1 ppm, and most preferably below the limit of detection, i.e., to substantially about 0 ppm. Thereafter, the treated liquid is mixed with an acrylamide polymer to form a polymer solution. The polymer can be added to the aqueous liquid in the form of a dry solid or a concentrated gel-like solution.

The acrylamide polymer used in the process of the present invention is a copolymer or homopolymer of an acrylamide monomer. Applicable acrylamide polymers include polyacrylamide and partially hydrolyzed polyacrylamide.

The acrylamide polymer increases the viscosity and screen factor of an aqueous fluid to which it is added. The actual viscosity and screen factor of the resulting polymer solution is a function of several variables including molecular weight and concentration. As a rule, both viscosity and screen factor increase with increasing molecular weight and concentration. Although not limited to the following specifications an acrylamide polymer is preferably selected for use in oil recovery applications which has an average molecular weight between about 2 million and about 20 million and preferably between about 4 million and about 15 million. The concentration of the polymer in solution is selected between about 100 ppm and about 10,000 ppm and preferably between about 300 ppm and about 3,000 ppm.

The polymer solution is injected into a subterranean oil-bearing formation to facilitate an oil displacement flood. The solution has utility inter alia as the primary flooding fluid of a polymer-augmented waterflood or as a component slug of a micellar flood. In any case the solution functions to control the mobility of the oil displacement flood.

The following example demonstrates the practice and utility of the present invention, but is not to be construed as limiting the scope of the invention.

EXAMPLE

Several different polymer solution samples are prepared for a series of experiments to determine the rate of polymer degradation in the solutions as a function of the solution storage environment. The samples are prepared by diluting a polymer in solution with an aqueous solvent to a predetermined concentration. In all cases the polymer is a partially hydrolyzed polyacrylamide (PHPA) which is 30% hydrolyzed and which has a molecular weight of about 11 million.

A volume of each sample is placed in a cylindrical jar and sealed such that a substantial head space remains in the jar. The head space is occupied by a selected gas. The sealed jar is rolled on its side continuously for an extended period of time to allow the gas in the head space to contact the polymer in solution.

At predetermined intervals during the contacting period, the viscosity and screen factor of the sample are measured to determine the rate of polymer degradation in the sample. The specific experimental conditions and results for each run are shown below.

RUN 1

The polymer solution has a PHPA concentration of 700 ppm. The solvent is an untreated brine having a hydrogen sulfide concentration of 225 ppm, a total dissolved solids concentration of 5,000 ppm and a hardness of 2,400 ppm. The head space gas is air.

TABLE 1

| Time (hours) | Viscosity (cp) | Screen Factor |
| --- | --- | --- |
| 0* | 7.2 | 32.0 |
| 1 | 5.5 | 23.9 |
| 6 | 4.4 | 11.3 |
| 24 | 2.5 | 1.6 |

RUN 2

All conditions are the same as Run 1 except that the solvent has a hydrogen sulfide concentration of 12 ppm, a total dissolved solids concentration of 260 ppm and a hardness of 126 ppm.

TABLE 2

| Time (hours) | Viscosity (cp) | Screen Factor |
| --- | --- | --- |
| 6 | 33.7 | 21.6 |
| 24 | 22.5 | 11.8 |
| 48 | 18.2 | 9.2 |
| 168 | 8.5 | 3.9 |

RUN 3

All conditions are the same as Run 1 except that the head space gas is nitrogen.

TABLE 3

| Time (hours) | Viscosity (cp) | Screen Factor |
| --- | --- | --- |
| 0* | 7.2 | 32.0 |
| 1 | 7.2 | 31.0 |
| 17 | 7.0 | 33.7 |

RUN 4

All conditions are the same as Run 1 except that the solvent has a hydrogen sulfide concentration of 0 ppm.

TABLE 4

| Time (hours) | Viscosity (cp) | Screen Factor |
| --- | --- | --- |
| 0* | 7.2 | 32.0 |
| 1 | 7.7 | 30.9 |
| 6 | 7.7 | 31.0 |
| 24 | 7.6 | 29.4 |

RUN 5

All conditions are the same as Run 1 except that the brine solvent of Run 1 free of polymer is pretreated by placing it in a jar. The head space gas in the jar is air. The jar is rolled continuously for 168 hours. The hydrogen sulfide concentration of the solvent at the end of the pretreatment is below 1 ppm. This solvent is then used to prepare the polymer solution in the manner of Run 1.

TABLE 5

| Time (hours) | Viscosity (cp) | Screen Factor |
| --- | --- | --- |
| 0* | 7.2 | 32.0 |
| 1 | 6.9 | 31.5 |
| 6 | 7.2 | 32.4 |
| 24 | 7.0 | 27.6 |
| 48 | 7.2 | 26.3 |

*Viscosity and screen factor at time 0 are not actually measured. Values are extrapolated from measurements at later times.

Runs 1 and 2 indicate that significant polymer degradation occurs when a PHPA solution containing hydrogen sulfide contacts air. Runs 3 and 4 are control runs which show that polymer degradation does not occur if either air or hydrogen sulfide is absent.

Run 5 is the process of the present invention. The hydrogen sulfide-containing brine is pretreated according to the present invention to reduce its hydrogen sulfide concentration below 1 ppm before formulating the polymer solution. Virtually no polymer degradation occurs when the resulting PHPA solution contacts air.

The small degree of variability in the data can be attributed to experimental error and mechanical degradation of the polymer caused simply by the rolling of the jar. However, the variation is within acceptable limits. The trend of the data clearly indicates the effectiveness of the present invention.

While the foregoing preferred embodiments of the invention have been described and shown, it is understood that all alternatives and modifications, such as those suggested and others, may be made thereto and fall within the scope of the invention.

I claim:

1. A process for recovering oil from a subterranean oil-bearing formation comprising the sequential steps of:
    (a) contacting an aqueous acrylamide polymer-free liquid with an oxygenating agent, wherein said aqueous acrylamide polymer-free liquid initially contains hydrogen sulfide in a sufficient concentration to substantially degrade an acrylamide polymer;
    (b) reducing the initial hydrogen sulfide concentration of said aqueous acrylamide polymer-free liquid;
    (c) mixing said aqueous liquid with said acrylamide polymer to form an aqueous acrylamide polymer solution;
    (d) injecting said aqueous acrylamide polymer solution into said subterranean oil-bearing formation; and
    (e) recovering oil from said formation.

2. The process of claim 1 wherein said oxygenating agent is oxygen.

3. The process of claim 1 wheein said oxygenating agent is air.

4. The process of claim 1 wherein said acrylamide polymer is partially hydrolyzed polyacrylamide.

5. The process of claim 1 wherein the initial hydrogen sulfide concentration of said aqueous liquid is greater than about 1 ppm.

6. The process of claim 1 wherein the initial hydrogen sulfide concentration of said aqueous liquid is greater than about 3 ppm.

7. The process of claim 1 wherein the initial hydrogen sulfide concentration of said aqueous liquid is reduced to below about 0.1 ppm.

8. The process of claim 1 wherein the initial hydrogen sulfide concentration of said aqueous liquid is reduced to substantially about 0 ppm.

9. The process of claim 1 wherein said aqueous liquid is a produced oil field brine.

10. A process for preparing a stable aqueous acrylamide polymer solution for use in oil recovery applications comprising the sequential steps of:
    contacting an aqueous acrylamide polymer-free liquid having an initial hydrogen sulfide concentration greater than about 1 ppm with an amount of an oxygenating agent sufficient to reduce the initial hydrogen sulfide concentration of said acrylamide polymer-free liquid; and
    mixing said aqueous liquid having a reduced hydrogen sulfide concentration with an acrylamide polymer to form a stable aqueous acrylamide polymer solution.

11. The process of claim 10 wherein said oxygenating agent is oxygen.

12. The process of claim 10 wherein said oxygenating agent is air.

13. The process of claim 10 wherein said acrylamide polymer is partially hydrolyzed polyacrylamide.

14. The process of claim 10 wherein the initial hydrogen sulfide concentration of said aqueous liquid is greater than about 1 ppm.

15. The process of claim 10 wherein the initial hydrogen sulfide concentration of said aqueous liquid is greater than about 3 ppm.

16. The process of claim 10 wherein the initial hydrogen sulfide concentration of said aqueous liquid is reduced to below about 0.1 ppm.

17. The process of claim 10 wherein the initial hydrogen sulfide concentration of said aqueous liquid is reduced to substantially about 0 ppm.

18. The process of claim 10 wherein said aqueous liquid is a produced oil field brine.

* * * * *